United States Patent Office 3,655,787
Patented Apr. 11, 1972

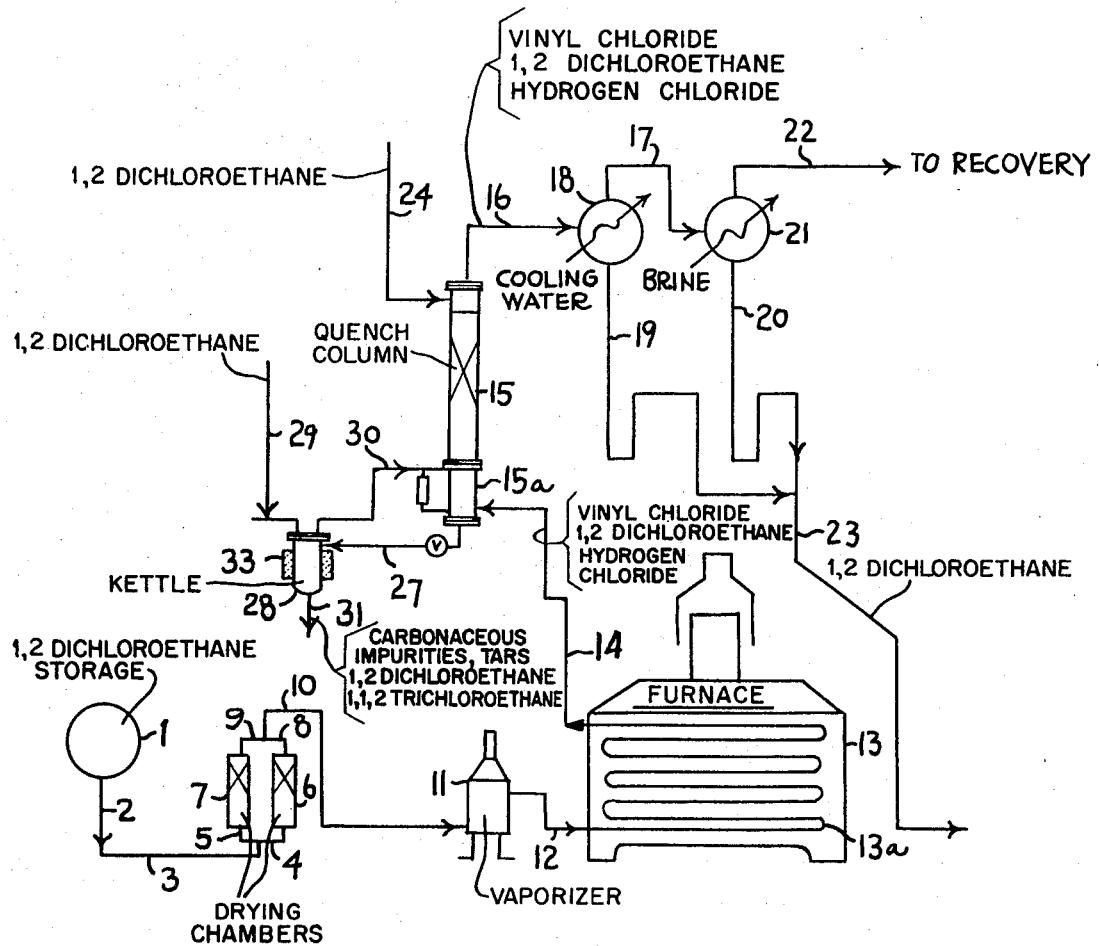

3,655,787
QUENCHING VINYL CHLORIDE CONTAINING
GAS STREAMS
Daniel E. Wiley, Corpus Christi, Tex., assignor to PPG
Industries, Inc., Pittsburgh, Pa.
Continuation-in-part of application Ser. No. 488,358,
Sept. 20, 1965. This application Nov. 15, 1968, Ser.
No. 776,207
Int. Cl. C07c 21/06
U.S. Cl. 260—656 R                    15 Claims

ABSTRACT OF THE DISCLOSURE

An improved method of operating a system for producing vinyl chloride from a 1,2-dichloroethane pyrolytic decomposition operation is described. The gas stream produced by the pyrolytic decomposition of 1,2-dichloroethane contains vinyl chloride, HCl, unreacted 1,2-dichloroethane, tars and carbonaceous solids. This gas stream is passed below the surface of a liquid body of hydrocarbon chlorides upon issuing from the cracking furnace and as it emerges from the liquid body, the gas then passes through a conventional gas-liquid contact zone for cooling. Passage of the gas through the liquid body removes tars and solids entrained in the gas stream and in this manner prevents fouling in the gas-liquid contact zone, stills and other auxiliary equipment. 1,2-dichloroethane is the liquid disclosed as the preferred hydrocarbon chloride for the liquid body. Passage of the gas through the liquid body is at a point at least 8 inches below the surface of the liquid body.

CROSS REFERENCE TO RELATED APPLICATIONS

This application is a continuation-in-part of application Ser. No. 488,358 filed Sept. 20, 1965, now abandoned.

The present invention relates to the production of vinyl chloride. More particularly, the present invention relates to improvements in the production of vinyl chloride by the thermal decomposition of 1,2-dichloroethane.

Vinyl chloride may be produced by the pyrolytic decomposition of 1,2-dichloroethane. Typically in a process of this type 1,2-dichloroethane is vaporized and introduced into a furnace operating at temperatures of about 350° C. to 700° C. The furnace may be operated at atmospheric pressures or pressures considerably above atmospheric. During the passage of the 1,2-dichloroethane vapors through the furnace, HCl is split off the 1,2-dichloroethane molecule to provide a vinyl chloride product stream containing HCl and unreacted 1,2-dichloroethane. During the pyrolysis of the 1,2-dichloroethane a certain amount of undesirable carbonization of the 1,2-dichloroethane vapors occurs. This is undesirable because of the loss of feed that it represents. This problem has been recognized in the art, for example in U.S. Pat. 2,803,680, column 1, lines 48–51.

During the production of vinyl chloride by the above described route it is conventional practice in the art to take the hot effluent gases and quench them with recycle condensate which is typically liquid 1,2-dichloroethane. During the quenching step the product stream is cooled to a temperature which is sufficient to avoid appreciable vinyl chloride condensation so that the solid by-products of the pyrolysis become entrained in an ethylene dichloride stream from which they can be removed. U.S. Pat. 3,055,955 in column 3, lines 55–75 and column 5, lines 1–13 describes a typical method of producing vinyl chloride by the pyrolysis method and the conventional methods employed to cool and remove the vinyl chloride product from the effluent gas stream.

While this method of producing vinyl chloride has enjoyed considerable success, certain deleterious effects do occur which interfere with the efficient operation of the system. Thus, while solid by-products of the pyrolysis step can be removed after the effluent gases have been quenched it is often found that vinyl chloride vapors issuing from the quenching step carry with them fine, carbonaceous materials to the still lines. Thus, carbonaceous impurities cause reboilers and column packings to be often inoperably fouled in the purification system. Fouling of equipment in this manner results in loss of efficiency as well as considerable amounts of down time for cleaning.

It has been found by virtue of the present invention that a quick effective method can be provided for insuring the substantial removal of all tars and carbonaceous impurities from the furnace effluent of a pyrolytic decomposition of 1,2-dichloroethane. In accordance with the present invention 1,2-dichloroethane is subjected to the action of heat in a furnace at sufficient temperatures to provide for the pyrolytic decomposition of 1,2-dichloroethane to produce HCl and vinyl chloride. The furnace vapors are then passed under a pool of quench liquor located preferably in the bottom of a liquid gas contact tower in which further quantities of quench liquor are showered upon the upwardly rising vapors issuing from the pool of quench liquor. The gases are passed from the quench liquor through the liquid-gas contact tower to the purification system. Gases treated in this manner are found to contain essentially no tars or carbonaceous impurities. The quench liquor is conveniently liquid 1,2-dichloroethane or mixtures of liquid hydrocarbon chlorides such as 1,1,2-trichloroethane, 1,1-dichloroethane, 1,1,1-trichloroethane and the like in addition to 1,2-dichloroethane. By operating with a system in accordance with the teachings of this invention, filters normally employed on the liquid streams passing to the purification system are no longer required for the purpose of removing carbonaceous materials or tars. Thus, the system of the present invention is extremely simplified over those commonly utilized in the prior art and a safe effective method of passing purified tar and carbonaceous-free vinyl chloride to the purification systems in a pyrolytic decomposition process is realized.

For a more complete understanding of the present invention, reference is made to the accompanying drawing which is a diagrammatic illustration of a process train suitable for use in producing vinyl chloride by the pyrolytic decomposition of 1,2-dichloroethane.

As shown in the drawing 1,2-dichloroethane which is to be pyrolyzed is contained in storage tank or vessel 1. Liquid 1,2-dichloroethane from the storage tank is passed through lines 2, 3, 4 and 5 to drying chambers 6 and 7 which conveniently may contain calcium chloride. The dried 1,2 - dichloroethane resulting from the passage through the drying chambers is introduced through lines 8, 9 and 10 to a vaporizer 11. Vapors of 1,2-dichloroethane issuing from the vaporizer 11 are passed through line 12 into a furnace 13. During their passage through the tubing 13a contained within the furnace, the vapors of 1,2 - dichloroethane are thermally decomposed or cracked to vinyl chloride and HCl. The gases emerging from the furnace through line 14 thus are vinyl chloride, HCl and unconverted 1,2-dichloroethane. These gases are passed to the bottom of a tower 15 which contains in the lower portion thereof a pool of liquid 1,2-dichloroethane. The tower is operated so that the gases passing through the tower are not cooled below a temperature which is just sufficient to avoid appreciable vinyl chloride condensation and thus, vapors of 1,2-dichloroethane, vinyl chloride and HCl rise through the packing in the tower and emerge through line 16. A line 24 for the introduction of liquid 1,2-dichloroethane enters the column at the uppermost portion so that the vapors in their passage through the packing contained within the tower are contacted with the downwardly falling liquid 1,2-dichloroethane. The gases emerging from the tower and leaving through line 16 are introduced into a condenser 18 the liquid being removed through line 19 and the uncondensed vapors leaving through line 17. The uncondensed vapors leaving through line 17 are introduced into a second condensing member 21 with the liquid material being removed through line 20 and the vapors being removed through line 22 to absorption and distillation equipment for the purpose of recovering purified vinyl chloride product. The material leaving the condensers through lines 19 and 20 may conveniently be introduced into a common line 23. The condensers function primarily to remove heat thereby reducing the heat load on the purification system. This is particularly true when the condensate is also forwarded through line 23 to the purification system. However, the liquid material leaving the condensers may be recycled for use as showering material for the tower 15 by passage through line 24. This liquid may also be recycled directly to the bottom of tower 15 as makeup liquid for the bottom section of the tower 15. 1,2-dichloroethane may be admitted to the bottom section of the column 15 through lines 29 and 30 through the kettle 28. Material from the column 15 bottom is fed to the kettle 28 through line 27. This 1,2-dichloroethane may be recycled material from line 23 or can conveniently comprise a 1,2-dichloroethane still product from the vinyl chloride recovery system.

A constant liquid level is maintained in the lower portion 15a of the column 15. This liquid level is maintained by controlling the admission to and removal from the column of the ethylene dichloride. This control is maintained by balancing the feed lines 14 and 24 and the exit line 27 located in column 15. The kettle member 28 utilized as a concentrating chamber for liquid material removed from section 15a of the column 15 and solid products which build up and contain carbonaceous impurities and tars removed from the gas stream contains a purge line 31 which is used to remove this material from the system.

The vinyl chloride passing to the recovery unit is recovered in accordance with conventional practice in the art and forms no part of the instant invention.

When furnace gases from a 1,2-dichloroethane cracking operation were conventionally quenched, that is, by introducing a liquid hydrocarbon chloride such as 1,2-dichloroethane into the exit furnace gas stream directly and passing the gas stream through a quenching column through which 1,2-dichloroethane was contacted with the gases, it was found that carbonaceous materials and tars found their way through the condensing system and into the absorption columns and distillation columns fouling plates, pumps and causing other similar mechanical problems. Operating in the manner described herein, that is, by introducing the furnace gases below the surface of a substantial body of liquid 1,2-dichloroethane, this problem was avoided, and carbonaceous material and tars did not leave the quenching column or find their way beyond the condensing system. Thus, the present invention provides a simple and economical method of preventing the fouling of auxiliary equipment designed for the recovery of vinyl chloride in a process in which vinyl chloride is produced by the pyrolytic decomposition of 1,2-dichloroethane.

In operating the quenching system in accordance with this invention, a pool of quenching liquid is maintained to provide a liquid level of liquor on the order of at least 8 inches in height and through which the furnace gases must pass prior to their contact with the showering liquid contained in the quenching column. While liquid levels should be maintained within this minimum depth, it is, of course, possible to increase this depth substantially without departing from the spirit of the invention. Thus, the quench chamber can include a liquid pool of 1,2-dichloroethane which has a substantial depth in a vertical direction through which the gases must pass considerably above the minimum limits hereinabove set forth. Liquid depth of 8 inches to 3 feet or more can be used with ease. The use of the liquid-gas contact zone above the quenching liquid pool is provided to insure that the vinyl chloride containing gas stream passing through the quenching column and quenching liquid body is cooled considerably but not so much as would result in appreciable condensation of vinyl chloride. The exact minimum temperature which may be allowed for a vinyl chloride gas stream containing 1,2-dichloroethane and HCl will, of course, depend upon the gas composition, the pressure and the amount of vinyl chloride condensation which is tolerable at the time. Usually, the amount of vinyl chloride condensation permitted should be a mere fraction of a percent. The magnitude of this value, as well as that of the pressure, is chiefly a matter of economics. Once the stream composition, pressure and the permissible vinyl chloride condensation have been determined, the minimum temperature may be determined by recourse to actual condensations of various streams for given compositions to determine this value empirically or by calculation from vapor-pressure data in the available literature. The minimum temperature is usually selected on these determinations to provide for little, if any, vinyl chloride condensation. This will be readily understood by the skilled art since similar experimentation and/or calculations have had to be made by the skilled artisan to maintain streams at a temperature sufficient to avoid appreciable vinyl chloride condensation as recited in U.S. Pat. 3,055,955. Typically, when a gas stream containing 41 mole percent vinyl chloride with the balance being 1,2-dichloroethane and HCl is fed to the quench column, the temperature of the gas stream leaving the gas-liquid contact zone is maintained above about 207° F. at a pressure of 50 p.s.i.g.

The particular type of column employed is of no consequence, though preferably the quenching chamber is located in a vessel which contains both the quenching liquid body through which the gases must pass and preferably a packed column located immediately above it as shown diagrammatically in the accompanying drawing. If desired, however, separate chambers can be employed. In this embodiment, the gases would then be passed first through the liquid body and then subsequently introduced into a quenching column, preferably a packed column, through which the gases would be passed in intimate contact with the downwardly flowing liquid stream of 1,2-dichloroethane. Obviously, other type columns may be used in lieu of the packed column shown in the drawing but a packed tower forms a preferred embodiment. The absorbing system, HCl stripping equipment and vinyl chloride distillation equipment used in the recovery units (not shown) are of conventional nature and form no part of the instant invention.

The following example illustrates the use of the equipment shown in the drawing during the operation of a 1,2-dichloethane pyrolytic decomposition run to produce vinyl chloride.

EXAMPLE

The furnace 13 employed was a gas fired Selas furnace containing 138 feet of coiled ¼-inch stainless steel tubing 13a. The inlet temperature 600° F. and the outlet temperature was 960° F. Pressure across the furnace tube varied from 70 p.s.i.g. at the inlet to 53 p.s.i.g. at the outlet. 1,2-dichloroethane was fed at the rate of 58 pounds per hour and the gases had a retention time in the furnace of 1.7 seconds. The furnace exit gases were passed to the column 15 through line 14 and entered section 15a. Column 15 was a 6-inch diameter steep pipe, 108 inches high. The quenching pool was located in section 15a which had an over-all height of 24 inches and was maintained with a liquid level therein by liquid feed to the column and liquid feed to the kettle 28 at 8 to 13 inches above the gas inlet line 14. A purge rate to kettle 28 of 3 inches of liquid (3.66 pounds per hour) was employed. A rod out mechanism was used in the furnace gas line 14 where it entered the column to prevent buildup of tars in the feed line 14 to the pool. A typical analysis of the liquid quench bottoms in 15a taken at various times is shown in Table I.

TABLE I.—QUENCH COLUMN BOTTOMS ANALYSES

| Sample | Total chloride, percent | Composition, wt. percent | | | | |
|---|---|---|---|---|---|---|
| | | Tars [1] | Vinyl chloride | 1,2-EDC [2] | 1,1,2-TCE [3] | Other |
| 1 | 68.2 | 1.67 | 0.80 | 89.24 | 1.68 | 6.60 |
| 2 | 68.0 | 1.66 | 0.87 | 84.24 | 7.81 | 5.42 |
| 3 | 65.8 | 3.32 | 1.09 | 84.68 | 5.30 | 5.60 |
| 4 | 67.3 | 4.35 | 0.79 | 79.05 | 10.00 | 5.80 |
| 5 | 69.2 | 1.91 | 0.74 | 90.75 | 2.65 | 3.95 |
| 6 | 67.2 | 0.81 | 4.10 | 92.44 | 0.54 | 2.12 |
| 7 | 68.3 | 0.46 | 2.82 | 93.54 | 0.64 | 2.54 |

[1] Non-volatile material boiling above 150° C.
[2] EDC=1,2-dichloroethane.
[3] TCE=1,1,2-trichloroethane.

This material entering the kettle 28 from 15a which has a steam jacket 33 is continuously concentrated for tar removal and purged on a once-a-day basis. Vapors of 1,2-dichloroethane leave the kettle during concentration along with 1,1,2-trichloroethane via line 30 and enter column 15. A typical analysis of several samples of these bottoms is shown in Table II.

TABLE II.—DOPP KETTLE BOTTOMS ANALYSES

| Sample | Total chloride, wt. percent | Composition, wt. percent | | | | |
|---|---|---|---|---|---|---|
| | | Ash, wt. percent | Tars [1] | 1,2-EDC [2] | 1,1,2-TCE [3] | Other |
| 1 | 70.2 | 0.08 | 7.86 | 39.78 | 32.08 | 20.28 |
| 2 | 71.4 | 0.04 | 4.56 | 43.28 | 32.16 | 19.99 |
| 3 | 65.4 | 0.10 | 7.55 | 25.66 | 30.99 | 35.81 |
| 4 | 69.3 | 0.15 | 7.91 | 40.22 | 31.07 | 20.80 |
| 5 | 67.1 | 0.14 | 9.97 | 33.50 | 26.79 | 29.74 |
| 6 | 68.8 | 0.04 | 5.35 | 46.08 | 25.64 | 22.94 |

[1] Non-volatile material boiling above 150° C.
[2] EDC=1,2-dichloroethane.
[3] TCE=1,1,2-trichloroethane.

During the operation of this system, no fouling of the vinyl chloride recovery system occurred and there was evidence of complete removal of tars and carbonaceous material from the vinyl chloride gas stream fed to the column 15.

While the invention has been described with reference to certain specific examples and illustrative embodiments, it is, of course, to be understood that the invention is not intended to be limited thereby except insofar as appears in the accompanying claims.

What is claimed is:

1. A method of quenching a gas stream comprising vinyl chloride, HCl and 1,2-dichloroethane produced by the pyrolytic decomposition of 1,2-dichloroethane and containing tars and carbonaceous solid by-products of pyrolysis comprising:
   (a) introducing said gas stream at least 8 inches below the surface of a liquid body comprising 1,2-dichloroethane to thereby substantially remove said tars and carbonaceous solid by-products from said gas stream;
   (b) passing said gas stream through said liquid body and into contact with further quantities of liquid 1,2-dichloroethane in a gas-showering liquid contact zone; and
   (c) removing said gas stream from said gas-liquid contact zone.

2. The method of claim 1 wherein said further quantities of liquid 1,2-dichloroethane and said gas stream are contacted countercurrently.

3. The method of claim 1 wherein:
   (a) liquid 1,2-dichloroethane from said gas-liquid contact zone is introduced into said liquid body; and
   (b) a portion of said liquid body containing dissolved tars and carbonaceous solid by-products of pyrolysis is withdrawn from said liquid body to eliminate said tars and said carbonaceous solid by-products of pyrolysis accumulating in said liquid body.

4. The method of claim 3 wherein said introduction and said withdrawal are continuous.

5. The method of claim 3 wherein 1,2-dichloroethane is removed from said withdrawn portion of said liquid body thereby concentrating said dissolved tars and said carbonaceous solid by-products of pyrolysis.

6. The method of claim 5 wherein said removed 1,2-dichloroethane is introduced to said gas-liquid contact zone.

7. The method of claim 5 wherein said concentrated dissolved tars and said carbonaceous solid by-products of pyrolysis are purged from the system.

8. The method of claim 7 wherein said purging is performed periodically.

9. The method of claim 1 wherein a portion of said removed gas stream is condensed.

10. The method of claim 9 wherein said condensate is introduced to said gas-liquid contact zone.

11. The method of claim 9 wherein said condensate is introduced to said liquid body.

12. The method of claim 9 wherein uncondensed vapor is introduced to a purification system for the recovery of purified vinyl chloride.

13. The method of claim 1 wherein there is no appreciable vinyl chloride condensation in said gas-liquid contact zone.

14. The method of claim 1 wherein said gas-liquid contact zone comprises packing within a tower.

15. A method of quenching a gas stream comprising vinyl chloride, HCl and 1,2-dichloroethane produced by the pyrolytic decomposition of 1,2-dichloroethane and containing tars and carbonaceous solid by-products of pyrolysis comprising:
   (a) introducing said gas stream into a liquid body of hydrocarbon chlorides containing 1,2-dichloroethane at least 8 inches below the surface of said liquid body to thereby substantially remove said tars and said carbonaceous solid by-products of pyrolysis;
   (b) passing said gas stream through said liquid body and into contact with further quantities of liquid hydrocarbon chlorides containing 1,2-dichloroethane in a gas-liquid contact zone to reduce the temperature of said gas stream while avoiding appreciable vinyl chloride condensation;
(c) removing said gas stream from said gas-showering liquid contact zone;
(d) cooling said gas stream to condense a portion thereof thereby forming a condensate;
(e) supplying said condensate as feed to said liquid body and said gas-liquid contact zone; and
(f) removing a portion of said liquid body to remove dissolved tars and carbonaceous solid by-products of pyrolysis accumulating therein.

References Cited

UNITED STATES PATENTS

| 2,442,324 | 5/1948 | Heitz et al. | 260—654 |
| 3,055,955 | 9/1962 | Hodges | 260—656 |

FOREIGN PATENTS

| 938,824 | 10/1963 | Great Britain | 260—656 |

HOWARD T. MARS, Primary Examiner

U.S. Cl. X.R.

260—652 P